US012486612B1

United States Patent
Bi et al.

(10) Patent No.: US 12,486,612 B1
(45) Date of Patent: Dec. 2, 2025

(54) PROVIDING CHARGE MITIGATION ON A SPACESUIT VIA A MXENE-BASED CONDUCTIVE PATHWAY

(71) Applicant: ACCENTURE GLOBAL SOLUTIONS LIMITED, Dublin (IE)

(72) Inventors: Lingyi Bi, Philadelphia, PA (US); Eric Michael Gallo, Moretown, VT (US); Aditi Maheshwari, Boston, MA (US); Lavinia Andreea Danielescu, Seattle, WA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 18/957,209

(22) Filed: Nov. 22, 2024

(51) Int. Cl.
| | |
|---|---|
| *B64G 6/00* | (2006.01) |
| *D03D 15/242* | (2021.01) |
| *D03D 15/283* | (2021.01) |
| *D03D 15/533* | (2021.01) |
| *D06M 11/74* | (2006.01) |
| *D06M 101/36* | (2006.01) |

(52) U.S. Cl.
CPC ............... *D06M 11/74* (2013.01); *B64G 6/00* (2013.01); *D03D 15/242* (2021.01); *D03D 15/283* (2021.01); *D03D 15/533* (2021.01); *D06M 2101/36* (2013.01); *D10B 2331/021* (2013.01); *D10B 2501/04* (2013.01)

(58) Field of Classification Search
CPC ..... D06M 11/74; D06M 2101/36; B64G 6/00; D03D 15/242; D03D 15/283; D03D 15/533; D10B 2331/021; D10B 2501/04
See application file for complete search history.

(56) References Cited

U.S. PATENT DOCUMENTS

| | | | | |
|---|---|---|---|---|
| 10,811,644 | B2 * | 10/2020 | Zhi | ........................ H01M 10/02 |
| 2016/0301096 | A1 * | 10/2016 | Zhamu | .................... H01G 11/24 |
| 2019/0372148 | A1 * | 12/2019 | He | ..................... H01M 10/0568 |
| 2021/0313587 | A1 * | 10/2021 | Kwon | ................. H01M 10/058 |
| 2021/0396607 | A1 * | 12/2021 | Uzun | ..................... H01G 11/30 |
| 2022/0010466 | A1 * | 1/2022 | Uzun | ..................... H01G 11/26 |
| 2023/0382080 | A1 * | 11/2023 | Conway | .................... B32B 5/18 |
| 2025/0169997 | A1 * | 5/2025 | Abbas | ............... A61F 13/15642 |

FOREIGN PATENT DOCUMENTS

| | | | | | |
|---|---|---|---|---|---|
| CN | 109527680 | A | * | 3/2019 | ............ D06M 15/37 |
| CN | 116465522 | A | * | 7/2023 | ............... A61B 5/00 |
| CN | 116811376 | A | * | 9/2023 | ............... B32B 5/26 |
| CN | 115116761 | B | * | 3/2024 | ............ H01G 11/86 |
| CN | 118461178 | A | * | 8/2024 | ............ H05K 9/009 |
| CN | 118814288 | A | * | 10/2024 | ............ A41B 17/00 |
| CN | 119824564 | A | * | 4/2025 | |

* cited by examiner

*Primary Examiner* — Robert H Muromoto, Jr.

(74) *Attorney, Agent, or Firm* — Mannava & Kang, P.C

(57) ABSTRACT

Systems, methods, and devices are directed to providing charge mitigation via a MXene-based conductive pathway on a spacesuit. In one aspect, a system for planetary exploration to provide charge mitigation on an outer surface of the spacesuit comprises a multilayered fabric including a woven layer, wherein the woven layer includes a first side to face a space environment and an opposing side to face a body of a wearer of the spacesuit and a MXene coating layer applied on the opposing side, wherein the MXene coating layer extends through the thickness the woven layer to conductively couple a first location on an exterior surface of the spacesuit with a second location on the exterior surface of the spacesuit.

20 Claims, 9 Drawing Sheets

US 12,486,612 B1

PROVIDING CHARGE MITIGATION ON A SPACESUIT VIA A MXENE-BASED CONDUCTIVE PATHWAY

TECHNICAL FIELD

This disclosure is generally directed to spacesuits for lunar exploration, and more specifically directed to providing charge mitigation on a spacesuit via a MXene-based conductive pathway.

BACKGROUND

Over time, impact of interstellar objects has caused the Moon's surface to pulverize, forming a layer of fine-grained material referred to as "regolith." Regolith is typically made of sharp and abrasive particles, which are often charged.

The surface charge and the jagged, rough morphology of regolith contributes to a "stickiness." This causes regolith to easily cling to exposed surfaces (e.g., spacesuits, optical lenses, thermal blankets, etc.). It may be appreciated that accumulated charged particles may cause a variety of problems in lunar exploration, including reduced visibility, mechanical failure(s), and breathing issues.

BRIEF DESCRIPTION OF THE FIGURES

Features of the present disclosure are illustrated by way of example and not limited in the following figure(s), in which like numerals indicate like elements, in which.

DETAILED DESCRIPTION

Figure 1:
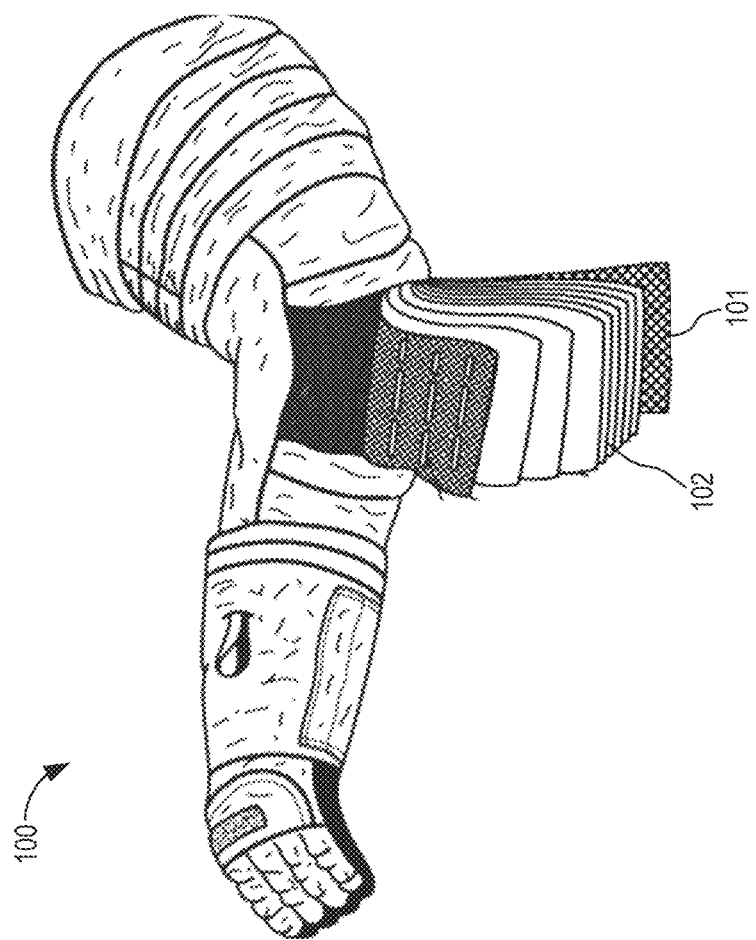
FIG. 1 illustrates various layers of a spacesuit, according to an example of the present disclosure.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

For simplicity and illustrative purposes, the present disclosure is described by referring mainly to examples thereof. In the following description, details are set forth in order to provide an understanding of the present disclosure. It will be readily apparent however, that the present disclosure may be practiced without limitation to these details. In other instances, some methods and structures have not been described in detail so as not to unnecessarily obscure the present disclosure.

BACKGROUND

The geological characteristics of the Moon are substantially different than that of the Earth. The Moon lacks a true atmosphere (such as that found on Earth), and therefore also has no weather or weather events. As such, impacts from interstellar objects (e.g., asteroids, comets, meteoroids, etc.) are a primary basis for geological change on the Moon's surface. Indeed, the Moon's surface has been subject to billions of years of collisions with a variety of interstellar objects.

Over time, the impact of these interstellar objects has caused the Moon's surface to pulverize, forming a layer of fine-grained material known as "regolith." Regolith may vary in size and may include dust (or "lunar dust"), rock, and/or soil particles. Regolith is typically comprised of sharp and abrasive particles, which are often charged (e.g., due to interaction with solar winds).

Large portions of the Moon's surface are covered by this charged dust, rock, and soil. Generally, this limits the surface's ability to perform as a "ground" to neutralize these charges.

Problems Posed by Regolith

The surface charge and the jagged, rough morphology of regolith contributes to a "stickiness." This causes regolith to easily cling to exposed surfaces (e.g., spacesuits, optical lenses, thermal blankets, etc.). It may be appreciated that accumulated charged particles may cause a variety of problems in lunar exploration, including reduced visibility, mechanical failure(s), and breathing issues.

In addition, when regolith particles are stirred up (e.g., during motion associated with robotic and human exploration, or when released naturally by meteorite impacts), they can easily enter small gaps and get trapped (e.g., in the crevices of a spacesuit). Also, the rough, jagged edges of the particles may also cause significant mechanical abrasion(s) on the surface of the spacesuit.

With particular regard to a spacesuit, it may be appreciated that these characteristics of regolith may pose significant issues for astronauts traversing the lunar surface. Typically, the regolith particles attach, stagnate, and continually collect on the surface of the spacesuit. Furthermore, these particles are generally resistant to cleaning, and even vigorous brushing is often insufficient.

Indeed, the continual collection of charged particles may often cause a continual charge "build-up." Charge buildup is often seen most in the boots region of the spacesuit. This charge buildup on a spacesuit may eventually cause discharge (i.e., sparks) or spacesuit malfunctions. As such, it is clear that issues associated with charged particle adhesion pose a significant concern for those seeking to perform lunar and space exploration.

Characteristics of a Typical Spacesuit

Typically, a spacesuit may include an outer layer comprised of one or more layers of specialty woven fabrics (also referred to as "Ortho-fabric"). In some examples, the specialty fabrics may be polymer fabrics, which may include one or more inter-woven layers of aramid yarns and fibers. These aramid yarns and fibers may provide, among other things, micro-meteoroid impact protection, thermal protection, and flame resistance.

Underneath the (outer) Ortho-fabric layer, one or more additional layers (and/or films) may be included. In some instances, these one or more additional layers may be comprised of Polyethylene terephthalate (PET). In addition to the PET layers, one or more other layers may be provided for a variety purposes, including pressure control, temperature control (e.g., cooling), and providing comfort.

FIG. 1 illustrates various layers of a spacesuit, according to an example of the present disclosure. In particular, FIG. 1 illustrates an arm portion 100 of a spacesuit. The arm portion 100 of the spacesuit may include an Ortho-fabric layer 101, wherein one (outer) side of the layer may be space-facing. The opposing (inner) side of the Ortho-fabric layer may face one or more additional layers 102.

In some instances, the various fabrics implemented in the Ortho-fabric layer 101 and/or the one or more additional layers 102 may be highly insulating, resulting in significant isolation and immobility of charges. As discussed above, this may cause a build-up of these charges along an outer surface of the spacesuit, where interaction(s) between these charged particles may disrupt functionalities of the spacesuit and the embedded electronics.

Introduction of Conductive Pathway(s)

It may be appreciated that introducing conductivity to the outermost layers of a spacesuit may provide mitigation of the effects of these charges. As used herein, "charge mitigation" may include any property or characteristic that may enable mitigation or neutralization of a charge. Specifically, this may include, but is not limited to, leveraging of different charges (i.e., charges sources) with respect to each to enable neutralization of the different charges.

By way of example, it may be beneficial to provide charge mitigation via a "conductive pathway" on a spacesuit that may enable neutralization of a first charge originating at a first location of the spacesuit by coupling to a second (opposing) charge originating at a second location of the spacesuit. That is, in the absence of a "ground" to serve as a sink/source for these charges, introducing such conductivity features to a spacesuit will enable overcoming of the aforementioned concerns.

However, it may be appreciated that introducing such conductive properties on a spacesuit may be difficult, as the presently constituting materials of a spacesuit have particular optical and mechanical properties that may not enable and/or facilitate this. For example, materials such as polytetrafluoroethylene (PTFE) may often exhibit highly insulating properties, thereby serving as charge "traps." In some instances, this may make charge capture and transfer (e.g., via a conductive pathway) difficult to achieve.

Aspects of the Present Invention

Systems and methods described herein may be directed to, among other things, providing conductive features and properties in a wearable garment (e.g., a spacesuit) to enable charge mitigation. In some examples, and as will be discussed further, this may include providing a conductive "envelope" around a wearer (e.g., an astronaut), wherein a carefully designed network of conductive materials may provide pathways implemented to capture and transport charges from a first location on a spacesuit to a second location on the spacesuit, and thereby enable various forms of charge mitigation.

So, in one example, and as will be discussed in further detail below, a first (e.g., negative) charge from a first particle located on a surface of a glove of a spacesuit may be captured and transported to a boot of the spacesuit to enable neutralization of a second (e.g., positive) charge located on a surface of the boot. Accordingly, the systems and methods described herein may enable charge mitigation for disparately located charges originating from a variety of sources located (i.e., trapped) on a spacesuit, these sources including but are not limited to regolith, lunar dust, plasma, and solar radiation.

MXene

In some examples, the systems and methods described herein may leverage conductive and solution-processing characteristic of a variety of highly conductive compounds. In particular, the systems and methods described herein may utilize anti-static and/or conductive material properties of MXene compounds (also referred to as "MXenes") to capture, transport, balance, and/or neutralize the charges to mitigate the harmful effects discussed above.

MXenes are a class of two-dimensional inorganic compounds. In some examples, MXenes may be atomically thin layers, and may be comprised of transition metal carbides, nitrides, or carbonitrides. MXenes may be implemented as two-dimensional (2D) nanomaterials, and as such may conductively couple large surface areas on a fabric. Examples of these MXenes may include, but are not limited to, titanium carbide ($Ti_3C_2$ or $Ti_2C$) and vanadium carbide ($V_2C$).

Coating Layer

To provide a conductive pathway and enable charge neutralization, in some examples, the systems and methods described herein may provide a coating or conductive layer that may be configured to facilitate conductivity of a spacesuit. Specifically, in some examples, a MXene coating layer may be coated on to a woven layer (e.g., an Ortho-fabric layer) of the spacesuit to enable conductivity. As discussed in further detail below, the MXene coating layer may be coated on an astronaut-facing surface of an Ortho-fabric layer to create a conductive pathway through and along an entire surface of an interior of the spacesuit. As used herein, an "astronaut-facing" surface may include any surface that may be located nearer to and/or towards the astronaut, and may be opposite to a second, opposing surface that may be facing, for example, outer space (i.e., a "space-facing" surface).

Figure 2:
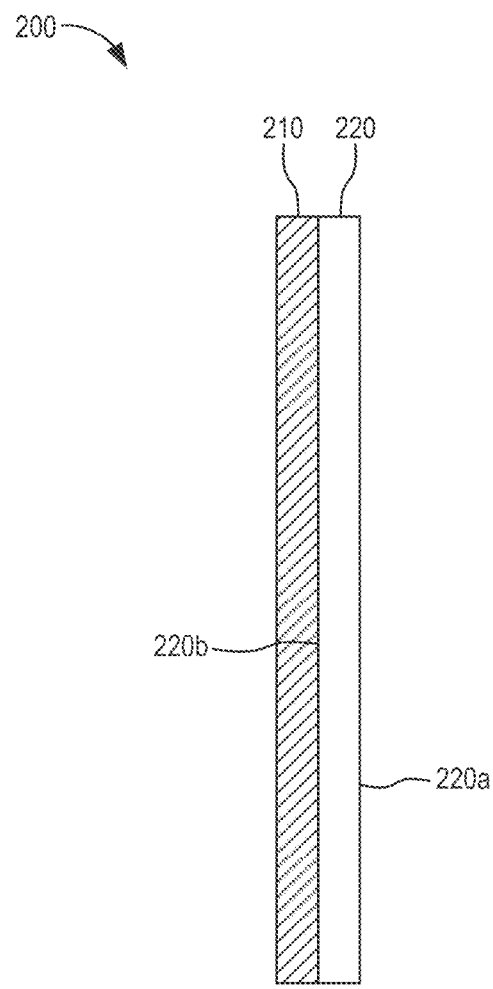
FIG. 2 illustrates a fabric configuration to enable a conductive pathway, according to an example of the present disclosure.

FIG. 2 illustrates a multilayered fabric 200 to enable a conductive pathway, according to an example of the present disclosure. In some examples, the multilayered fabric 200 may include an Ortho-fabric layer 220, having an outer surface 220a that may be space-facing, and an inner surface 220b that may be astronaut-facing.

In some examples, and as will be discussed further below, a coating layer 210 (e.g., comprised of a MXene compound) may be coated on to the inner surface 220b (or "backside") of the Ortho-fabric layer 220. This (coated) multilayered fabric 200 may then be used to fabricate (e.g., cut and sewn into) a spacesuit.

In some examples, the coating layer 210 may exhibit low resistance and may provide effective charge equalization throughout the entire suit. Accordingly, the coating layer 210 may serve as a de-facto ground plane and equipotential layer to provide a conductive pathway that may neutralize collected charges over an entirety of the spacesuit.

Mxene Pathways

Furthermore, in some examples and as will be discussed further below, a conductive material (e.g., MXenes) may be distributed inside a layer of a spacesuit to enable conductivity. So, by way of example, MXene nanoparticles may be distributed through an Ortho-fabric layer of a spacesuit to enable transfer of charges from one side (or surface) of the Ortho-fabric layer to an opposing side of the Ortho-fabric layer.

Figure 3:
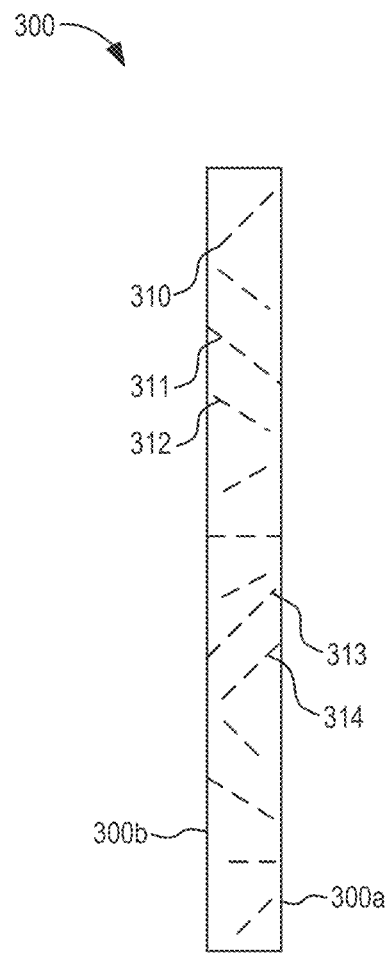
FIG. 3 illustrates an outer layer that includes a plurality of MXene pathways, according to an example of the present disclosure.

FIG. 3 illustrates an outer layer 300 (e.g., an Ortho-fabric layer) that includes a plurality of MXene pathways, according to an example of the present disclosure. As used herein, "MXene pathway" may refer to an opening, crevice, fissure, or the like, in one or more layers of fabric where MXene particles may enable conductivity. As will be discussed in further detail below, these MXene pathways may be formed in a variety of ways, including infiltration or spinning.

In the example illustrated in FIG. 3, the outer layer 300 may have an outer surface 300a and an inner surface 300b. In some examples, the MXene pathways 310-314 may conductively couple the outer surface 300a and the inner surface 300b. So, in some examples, a charge (e.g., from a particle attached to the outer surface 300a) may be transferred from the outer surface 300a to the inner surface 300b via the MXene pathways 310-314. Accordingly, in this manner, the MXene pathways 310-314 may enable capture and neutralization of charges attached to an outer layer of a spacesuit and may prevent damage due to charge buildup via introduction of charge equilibrium throughout the spacesuit.

Coating Layer and MXene Pathways in Combination

Figure 4:
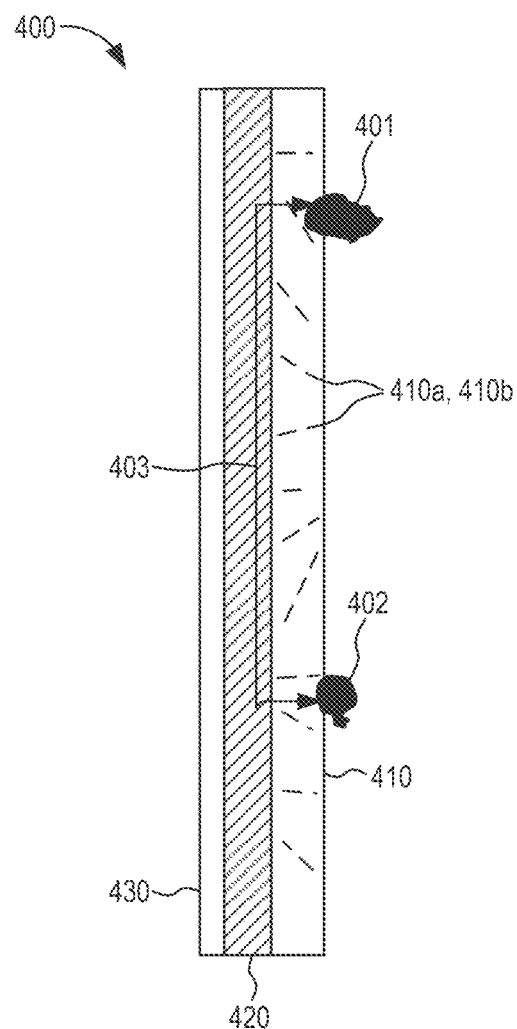
FIG. 4 illustrates a fabric configuration enabling a conductive pathway, according to an example of the present disclosure.

Accordingly, the systems and methods may utilize one or more of a coating layer and a MXene pathway as described herein to enable a conductive pathway to capture and neutralize charges attached to a spacesuit. FIG. 4 illustrates a multilayered fabric 400 enabling a conductive pathway, according to an example of the present disclosure. Specifically, the multilayered fabric 400 may include an outer layer 410 and a coating layer 420. In some examples, the outer layer 410 may include one or more MXene pathways 410a, 410b that may conductively couple the outward-facing surface of the outer layer 410 with the coating layer 420.

In some examples, the outer layer 410 may be an Ortho-fabric layer, and the coating layer 420 may be a MXene coating layer. It may appreciated that, in other examples, other materials may be used instead.

So, in some examples, the multilayered fabric 400 may provide charge mitigation for a first charged particle 401 and a second charged particle 402. That is, in an example where the first charged particle 401 having a first (e.g., negative) charge may be attached at a first location on a surface the outer layer 410, and the second charged particle 402 having a second (e.g., positive charge) may be attached at a second location on the surface of the outer layer 410, the one or more MXene pathways 410a, 410b and the coating layer 420 may enable transfer of the first charge from the first location to the second location (or transfer of the second charge from the second location to the first location) via a conductive pathway 403, and enable the two charges to neutralize each other.

In some examples, an encapsulation layer 430 (e.g., comprised of PTFE, silicone, or polyethylene) may be provided on side of the coating layer 420 opposite to the outer layer 410. In some examples, the encapsulation layer 430 may be provided to protect the coating layer 420 against abrasion from inner layers, and to prevent flaking caused by repeated flexing of fabric (e.g., Ortho-fabric) layers.

Figure 5:
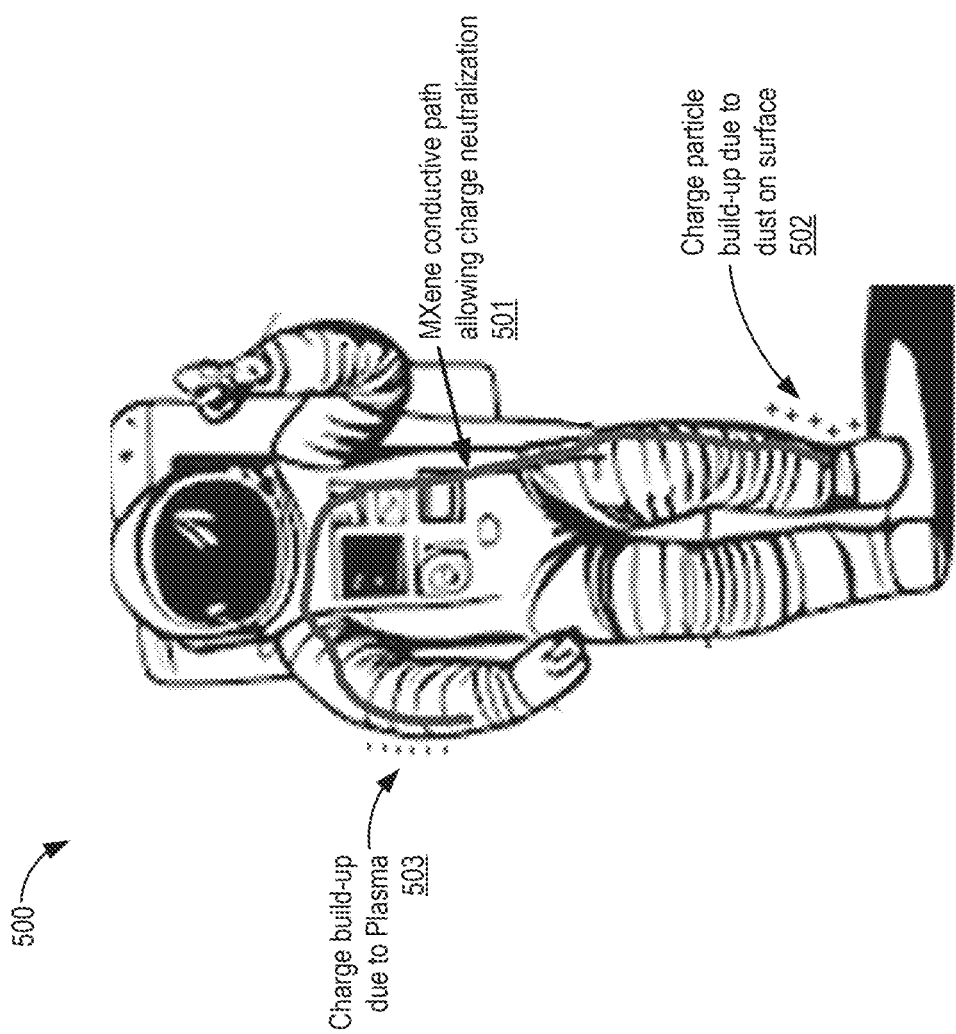
FIG. 5 illustrates a conductive pathway for a spacesuit, according to an example of the present disclosure.

FIG. 5 illustrates a conductive pathway 501 for a spacesuit 500, according to the examples of the present disclosure. In particular, the conductive pathway 501 may couple charges from a first charge buildup located at a first location 502 (e.g., at the left boot) of the spacesuit with charges from a second buildup located at a second location 501 (e.g., at the right elbow) of the spacesuit, thereby providing charge mitigation. In particular, one or more MXene pathways (e.g., similar to 410a, 410b in FIG. 4) and a coating layer (e.g., similar to 420 in FIG. 4) may form a conductive pathway and may enable a de-facto "ground" for the spacesuit, thereby limiting opportunities for charge buildup.

It may be appreciated that the charge mitigation techniques described herein may enable easier removal of particles from a spacesuit. Moreover, in examples where the conductive pathway includes charge mitigation for boots on the spacesuit, the conductive pathway 501 may enable use of plasma discharge to balance charge buildup due to surface soil contact, potentially even in lunar "no sun" conditions where only plasma may be available for charge balancing.

In addition, conductive properties (e.g., MXene pathways) may be incorporated onto outsoles, uppers, and galoshes of the boots to provide additional avenues for charge balancing by providing a pathway for charges to exit to and interact with charged particles located on the ground, thereby neutralizing charged particles even before they attach to the spacesuit.

It may be appreciated that the one or more MXene pathways and the coating layer, due to their reflective properties (i.e., for electromagnetic (EM) radiation), may enable creation of a surrounding "cage" that may prevent electromagnetic (EM) radiation from leaving or entering. That is, internal EM radiation will be reflected inward, while outer EM radiation will be reflected outward. As such, this surrounding cage comprised of the one or more MXene pathways and the coating layer may be implemented to trap and preserve thermal radiation emitted from human body (i.e., "heat reflecting") while preventing extreme heat when facing the sun (i.e., "thermal shielding"). In some instances, this may (potentially) negate a need for several insulating layers of the spacesuit, thereby reducing spacesuit weight and simplifying the spacesuit fabrication process.

Benefits of Using MXene Compounds

As stated above, although various materials may be used to provide conductive pathways and coating layers similar to those described herein, use of MXene compounds may provide various and particular benefits. Some of the benefits associated with the use of MXene compounds are as follows.

MXene compounds may typically be highly conductive, enabling efficient charge mitigation. In some examples, the MXenes may take the form of flakes that lie flat against each other, thereby providing very thin, two-dimensional (2D) configuration(s) that may be highly flexible, and may integrate into fabrics relatively easily.

Furthermore, and as will be discussed in greater detail below, MXenes may enable direct integration with polymeric fibers, allowing designers to adjustably provide necessary levels of conductivity in textile design, while requiring only minor changes to a fabric's physical properties and appearance. Indeed, due to the extremely low MXene concentration and layer thicknesses involved, a thin, flexible MXene layer may be applied to a wide variety of materials without significantly modifying the stiffness of these materials. It may be appreciated that relatively thicker layers of MXene have been shown to provide higher levels of conductivity than that of relatively thinner layers.

Also, in some examples, MXene compounds may be solution-processed, in that they may be dispersed in carrier liquids for, for example, mixing or intertwining with aramid polymers. Indeed, in some instances, MXene particles typically display strong bonding characteristics with a variety of aramid fibers, thereby providing for strong adhesion during fabrication.

As a result, via use of these carrier liquids, MXene nanoparticles may be infiltrated or spun into polymer fibers to enable electrical conductivity of a fabric (e.g., Ortho-fabric). Also, in some examples, MXenes may be mixed with one or more polymers, and (then) may be spun into fibers, yarns, and/or fabrics that may provide charge mitigation. MXenes are typically also flame resistant and may enable self-cleaning properties for spacesuits as well.

Fabrication of MXene Pathways—First Method (Treatment/Penetration)

Figure 6:
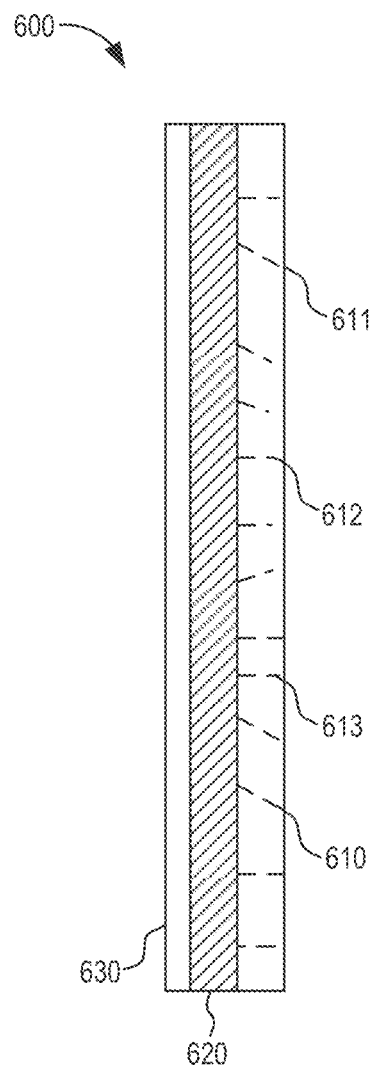
FIG. 6 illustrates a multilayered fabric where treatment, infiltration, and penetration may be used to form one or more MXene pathways, according to an example of the present disclosure.

As discussed above, MXene pathways (e.g., similar to 410a, 410b in FIG. 4) as described herein may be fabricated via multiple methods. In a first method, as discussed in further detail below, MXene solution may be applied (or "treated") to enable penetration and infiltration into openings or gaps of a fabric (e.g., an Ortho-fabric layer). Application of the MXene solution may result in patterned or non-patterned coatings, and may be accomplished via various techniques including, but not limited to, spray coating, dip coating (Pad-Dry Cure), roll coating, knife coating, knife-over-roll coating, screen printing, inkjet printing, stamp printing, emboss printing, and roller printing. FIG. 6 illustrates an example of a multilayered fabric 600 where treatment and penetration may be used to form one or more MXene pathways, according to an example of the present disclosure.

In some examples, the multilayered fabric 600 may include an outer layer 610, a coating layer 620, and an encapsulation layer 630. In some examples, the coating layer 620 may be comprised of a MXene compound (i.e., a MXene coating layer). The outer layer 610 may include MXene pathways 611-613 that may conductively couple the outer surface of the outer layer 610 and the coating layer 620.

In particular, and as will be discussed in greater detail below, because the MXene pathways 611-613 may be formed via treatment (and consequent penetration) of the MXene compound into the outer layer 610, the MXene pathways 611-613 may extend from a direction of the opposing surface. More specifically, the MXene pathways may extend from the astronaut-facing side of the outer layer 610 towards the space-facing side of the outer layer 610. In some instances, a MXene pathway of the MXene pathways 611 may extend fully from the astronaut-facing side of the outer layer 610 towards the space-facing side of the outer layer 610 (e.g., MXene pathway 631), while in other examples, a MXene pathway of the MXene pathways 612 may extend partially from the astronaut-facing side of the outer layer 610 towards the space-facing side of the outer layer 610 (e.g., MXene pathway 632).

It may be appreciated that it may not be necessary that the MXene pathways 611-613 enable the outer layer 610 to be highly conductive, but instead only be semi-conductive. Specifically, as the primary purpose of the MXene pathways 611-613 may be to conductively couple the space-facing surface of the outer layer 610 with the coating layer 620 (i.e., over a relatively small distance), a partially conductive property may often be sufficient.

Figure 7:
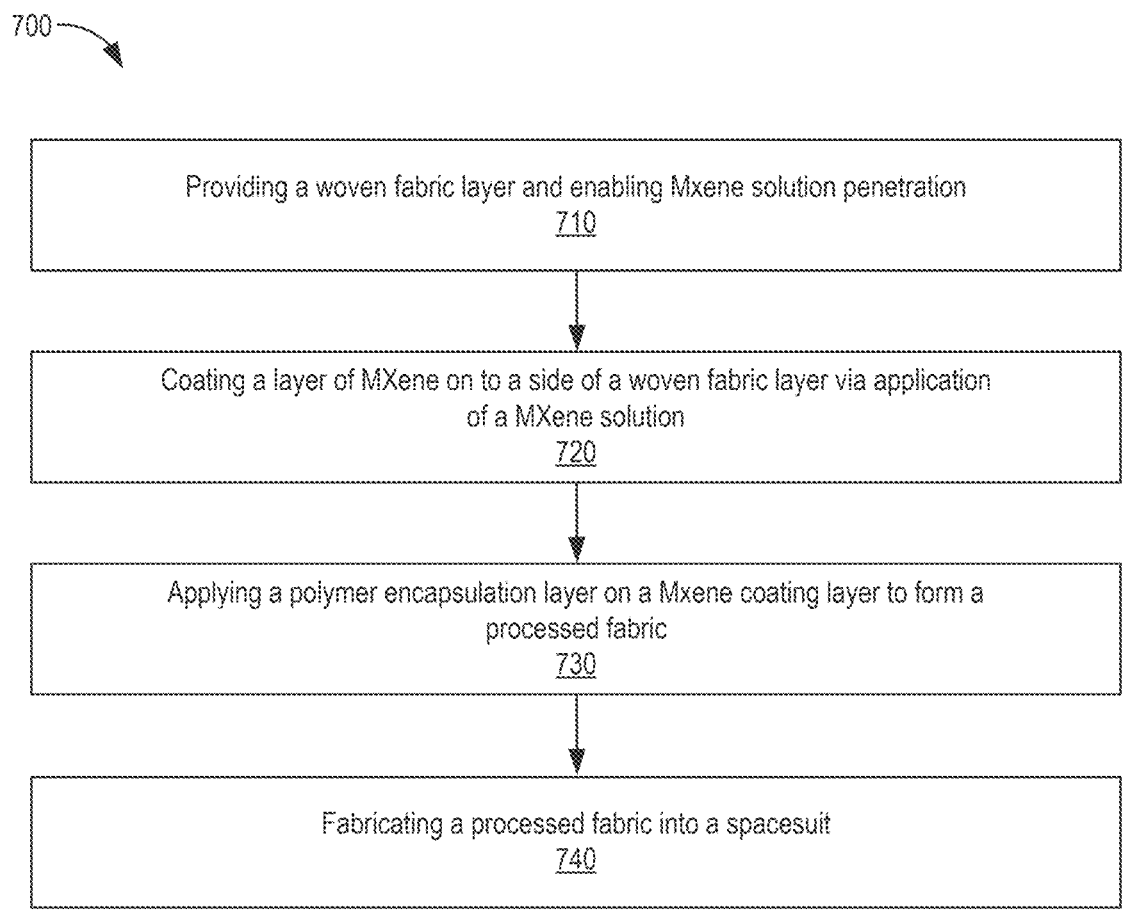
FIG. 7 illustrates a method for fabrication of a spacesuit having conductive pathways, according to an example of the present disclosure.

FIG. 7 illustrates a method for fabrication of a spacesuit having a conductive pathways, according to an example of the present disclosure. The method 700 is provided by way of example, as there may be a variety of ways to carry out the method described herein. Each block shown in FIG. 7 may further represent one or more processes, methods, or subroutines, and one or more of the blocks may include machine-readable instructions stored on a non-transitory computer-readable medium and executed by a processor or other type of processing circuit to perform one or more operations described herein. Furthermore, the method 700 may be executed or otherwise performed by other systems, or a combination of systems.

Reference is now made with respect to FIG. 7. At 710, the method may include providing a woven layer (e.g., the outer layer 610 in FIG. 6) having a first surface to face an outer space environment and an opposing surface to face a body of a wearer of the spacesuit. In some examples, the woven layer may include openings (or gaps) between fabric yarns and/or filaments. Also, in some examples, the woven layer may include particular (i.e., selected) spacing(s) between fabric filaments. Furthermore, in some examples, the woven layer may include particular spacing(s) so as to enable and/or control an infiltration and/or penetration depth of a MXene solution and to enable formation of one or more MXene pathways.

In some examples, the woven layer may be fabricated and/or chemically treated to increase its affinity with a MXene solution. For example, various pretreatment methods may be implemented to enhance various aspects, including (but not limited to) increasing hydrophilicity of the fabric, promoting MXene penetration into the fabric, and improving MXene adhesion characteristic of the fabric. These pretreatment methods may include, but are not limited to, plasma and mild alkaline etching.

At 720, a layer of MXene may be coated on to a side of a woven layer via application of a MXene solution. For example, in some instances, the MXene solution may be coated on a side (or "back side") that is intended to be facing the wearer (e.g., 300b in FIG. 3), and opposite from the side that is to be facing space (e.g., 300a in FIG. 3).

In some examples, the MXene coating may be formed via a plurality of applications (or "passes") of the MXene solution. So, in some examples, a first pass of MXene solution may be applied (e.g., via a spray or blade coating method) to a surface of the back side of the woven fabric to enable MXene solution infiltration and/or penetration, and thereby enable creation of one or more MXene pathways.

More specifically, the MXene solution may be coated to enable nanoparticles of the MXene solution to penetrate (or infiltrate) through openings, crevices, fissures, or the like (i.e., MXene pathways) towards the outer surface of the multilayered fabric. As discussed above, the penetration of the MXene solution through the MXene pathways may enable formation of one or more MXene pathways that may conductively couple the outer surface of the multilayered fabric and the (to be formed) MXene coating layer. In some examples, the MXene solution may be applied through a spray or blade coating method to the back side surface of the multilayered fabric.

In some examples, various aspects of the MXene solution, treatment setting, and application parameters may be optimized to enable proper penetration of the MXene solution. In particular, the penetration may ideally be sufficient to reach or nearly reach the space-facing, outer surface of the woven layer (i.e., to conductively couple the outer surface of the multilayered fabric and the (to be formed) coating layer).

Furthermore, these aspects may be individually optimized according to particular characteristics of the woven layer being utilized.

In particular, and by way of example, viscosity of the MXene solution may be optimized to facilitate penetration in the fabric by adjusting, among other things, size(s) of the MXene particles in the MXene solution, concentration of the MXene solution, and aspects of a carrier liquid used to prepare the MXene solution. For example, in some instances, MXene particles (e.g., having a size of less than two-hundred (200) nanometers (nm)) may be preferable. Furthermore, in some instances, MXene concentrations of less than 10 milligrams per milliliter (mg/ml) may be preferable. Also, in some instances, low viscosity carrier liquids (e.g., water and ethanol) may be utilized to promote MXene penetration into the multilayered fabric.

As discussed above, MXene compounds may be solution-processed in that the MXene compound may be dispersed in carrier liquids (e.g., to enable mixing in aramid polymers). The carrier liquid materials may then be evaporated or otherwise removed (e.g., via application of heat and/or vacuum), leaving the (penetrated) MXene particles in the fabric.

In some examples, an external force may be applied (e.g., a vacuum or pressure force) during or after application of the MXene solution to further facilitate infiltration of the MXene solution. In some examples, pressure may be applied on to the back side, where this pressure may be up to five (5) bars. In some examples, a vacuum force may be applied on the front side (e.g., down to zero-point-one (0.1) Torr), and may be applied in combination with pressure applied on the back side. In some examples, the pressure and/or the vacuum may be applied prior to evaporation of the carrier liquid to enable movement of MXene particles through the fabric.

Upon providing MXene penetration via a first pass, a second pass of MXene coating may be applied. In some examples, the second pass of MXene coating may be applied with a spray coating, while in other examples, it may be applied via blade coating. In still other examples, the second pass of MXene coating may be applied via any selection or sequence of the other coating and printing methods described in this disclosure. In some examples, the application of the second pass may facilitate creation of a uniform layer (e.g., having a two-hundred (200) nanometer (nm) to one (1) micrometer (μm) thickness) of MXene coating on the backside of the fabric.

In some examples, it may be preferable to use large(r) MXene particles (e.g., greater than one (1) micrometer (μm)) with higher MXene concentrations for the second pass to achieve optimal MXene alignment in the coating, and to minimize resistance. Upon application of this second pass, the backside layer may be allowed to dry, leaving behind a MXene integrated fabric with a continuous, backside MXene coating layer of low resistance.

At 730, the method may include applying a polymer encapsulation layer on the MXene coating layer to form a processed fabric. Specifically, a coating or "backing" layer of MXene (as described above) may be encapsulated on the inside with an additional layer of polymer (e.g., PTFE, silicone, polyethylene, etc.) to prevent MXene flaking or removal under bending or frictional stress. In some examples, the encapsulation layer may be blade coated or laminated as a sheet on the MXene coating layer to prevent flaking, and in order to introduce an insulating layer.

Also, in some examples, separate pieces of the coated fabric may be joined by sewing (e.g., conductive threads). In some examples, a MXene-based glue may be applied at stitch portions to enhance conductivity. In other examples, the stitch portions may be covered with adhesive conductive fabric tape. Finally, the stitched area may be sealed with an encapsulation (e.g., PTFE).

The encapsulation layer may provide a smooth surface to reduce friction for the movement of underneath layers, which may ensure comfort and flexibility. Moreover, in some examples, this application can be controlled at the edges, to leave conductive areas to attach multiple swatches together (i.e., to create conductive seams).

At 740, the method may include fabricating (e.g., cutting, tailoring, and sewing) a processed fabric, having a coating layer, MXene pathways, and an encapsulation layer, into a spacesuit. In this manner, as discussed above, the one or more MXene pathways and the coating layer may enable creation of an EM radiation "cage" inside the spacesuit that may prevent electromagnetic (EM) radiation from leaving or entering.

Fabrication of MXene Pathways—Second Method (Mixing and Spinning)

Figure 8:
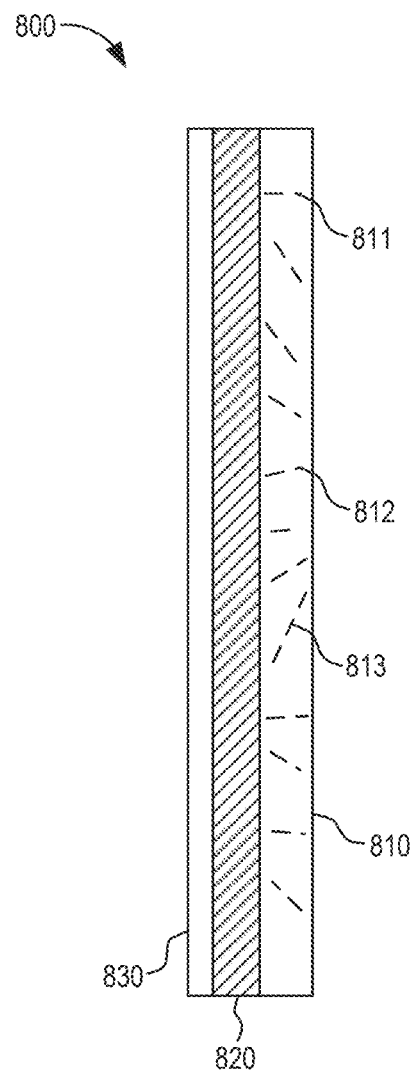
FIG. 8 illustrates a multilayered fabric where MXene pathways may be spun during fabrication of a woven layer, according to an example of the present disclosure.

As discussed above, MXene pathways (e.g., similar to 410a, 410b in FIG. 4) as described herein may be fabricated via multiple methods. In a second method, as discussed in further detail below, MXene solution may be introduced into a fabric (e.g., a woven Ortho-fabric layer) to which the MXene solution may be applied to form a coating layer. More specifically, and as will be discussed in further detail below, the MXene solution may be mixed with polymers to produce composite fibers, which may then be weaved into various fabrics (e.g., Ortho-fabric). FIG. 8 illustrates a multilayered fabric where MXene pathways may be spun during fabrication of a woven layer, according to an example of the present disclosure.

In some examples, the multilayered fabric 800 may include an outer layer 810, a coating layer 820, and an encapsulation layer 830. In some examples, the coating layer 820 may be comprised of a MXene compound. The outer layer 810 may include MXene pathways 811-813 that may conductively couple the outer surface of the outer layer 810 and the coating layer 820, as described above. In some examples, the MXene pathways 811-813 may be embedded using a mixing and spinning process, the MXene pathways 811-813 may extend in any general direction (e.g., a variety of directions) to conductively couple the outer surface of the outer layer 810 and the coating layer 820.

Figure 9:
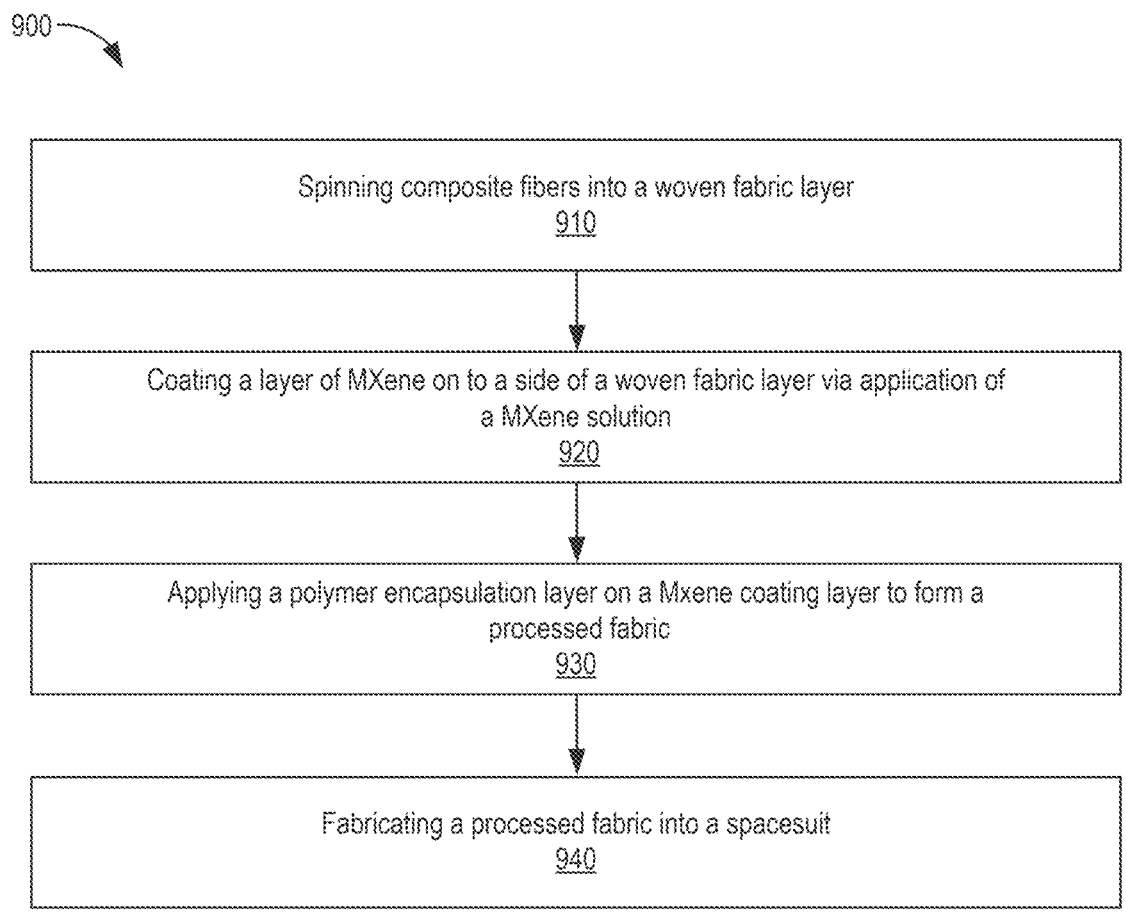
FIG. 9 illustrates a method for fabrication of a spacesuit having conductive pathways, according to an example of the present disclosure.

FIG. 9 illustrates a method for fabrication of a spacesuit having conductive pathways, according to an example of the present disclosure. The method 900 is provided by way of example, as there may be a variety of ways to carry out the method described herein. Each block shown in FIG. 9 may further represent one or more processes, methods, or sub-routines, and one or more of the blocks may include machine-readable instructions stored on a non-transitory computer-readable medium and executed by a processor or other type of processing circuit to perform one or more operations described herein. It may be appreciated that aspects of the method described in FIG. 7 may interchangeably be implemented in the method described in FIG. 9, and vice versa.

Reference is now made with respect to FIG. 9. At 910, the method may include providing a woven layer (e.g., the woven layer 800 in FIG. 8) including one or more woven layers (e.g., the outer layer 810 in FIG. 8). In some examples, the woven layer may have a first surface to face an outer space environment and an opposing surface to face a body of a wearer of the spacesuit. Also, in some examples, the woven layer may be an Ortho-fabric layer.

In some examples, to create one or more MXene pathways, the MXene solution can be mixed with a polymer to form composite fibers, and the resulting composite fibers may be spun into various fabrics (e.g., Ortho-fabric). That is, these composite fibers may then be twisted into yarns, and the yarns may be fabricated into the various woven fabrics.

In order to achieve a lower percolation threshold, large(r) MXene flakes (e.g., over one (1) micrometer (μm)) may be preferred. Furthermore, in some examples, the MXene solution may undergo a solvent exchange into organic solvents, such as dimethylformamide (DMF) and phenylmethylsulfonyl fluoride (PDMF), before mixing with polymers (e.g., aramid polymers) that may be present in the woven layer and the mixture is to be wet-spun into composite fibers. In some examples, a MXene loading of less than zero point five (0.5) percent (%) weight may achieve sufficient fiber conductivity sufficient for antistatic function (required to be higher than 10-9 Siemen per centimeter (S/cm)).

It may be appreciated that, in some instances, MXene integrated fibers may introduce changes in color to an exterior of a spacesuit. However, any loss in solar reflection due to the color change may likely be compensated by introduction of an interior MXene layer.

At 920, a layer of MXene may be coated on to a side of a woven layer via application of a MXene solution. A pass of MXene coating may be applied via various methods, including and not limited to spray coating and blade coating. In some examples, the application may facilitate creation of a uniform layer (e.g., having a two-hundred (200) nanometer (nm) to one (1) micrometer (μm) thickness) of MXene coating on the backside of the fabric.

Upon application, the backside coating layer may be allowed to dry, leaving behind a MXene integrated fabric with a continuous backside layer of MXene of low resistance.

At 930, the method may include applying a polymer encapsulation layer on the MXene coating layer. Specifically, a "backing" layer of MXene (as described above) may be encapsulated on the inside with an additional layer of polymer (e.g., PTFE, silicone, or polyethylene) to prevent MXene flaking or removal under bending or frictional stress.

At 940, the method may include fabricating (e.g., cutting, tailoring, and sewing) a processed fabric, having a coating layer, MXene pathways, and an encapsulation layer, into a spacesuit. In this manner, the one or more MXene pathways and the coating layer may enable creation of an EM radiation "cage" inside the spacesuit that may prevent electromagnetic (EM) radiation from leaving or entering, as described above.

Accordingly, in some examples, the systems and methods described herein may include a spacesuit for planetary exploration to provide charge mitigation on an outer surface of the spacesuit, the spacesuit comprising a multilayered fabric including a woven layer, wherein the woven layer includes a first side to face a space environment and an opposing side to face a body of a wearer of the spacesuit, and a MXene coating layer applied on the opposing side, wherein the MXene coating layer extends along the woven layer to conductively couple a first location on an exterior surface of the spacesuit with a second location on the exterior surface of the spacesuit. In some examples, the woven layer is comprised of an aramid fiber, the woven layer includes a plurality of MXene pathways to conductively couple the exterior surface of the spacesuit with the MXene coating layer, and the plurality of MXene pathways extend from a direction of the opposing surface. Furthermore, in some examples, the spacesuit may further comprise a polymer encapsulation layer applied onto the MXene coating layer. In some examples, a thickness of the MXene coating layer is between two-hundred (200) nanometers (nm) and one (1) micrometer (μm) in thickness), and the MXene coating layer may be comprised of various MXene compounds, including but not limited to titanium carbide (Ti3C2 or Ti2C) and vanadium carbide (V2C).

In some examples, the systems and methods described herein may include a method for manufacturing fabric for a spacesuit having charge mitigation properties, the method comprising providing a woven layer having a first surface to face an outer space environment and an opposing surface to face a body of a wearer of the spacesuit, integrating a plurality of MXene pathways in the woven layer to conductively couple the first surface and the opposing surface, and coating a layer of MXene particles on the opposing surface of the woven layer to form a MXene coating layer. In some examples, the method may include integrating the plurality of MXene pathways and treating the opposing surface with a MXene mixture liquid to enable penetration of the MXene mixture liquid in the woven layer, wherein the MXene mixture liquid comprises a MXene compound and a carrier liquid, and wherein the plurality of MXene pathways extend from a direction of the opposing surface. In some examples, the method includes providing the woven layer, treating the woven layer to increase affinity between textile filaments of the woven layer and the MXene compound, and providing the woven layer includes fabricating the woven layer to include predetermined spacing between textile filaments of the woven layer. In some examples, the MXene compound is vanadium carbide (V2C).

In some examples, the systems and methods described herein may include a method for manufacturing fabric for a spacesuit having charge mitigation properties, comprising providing a woven layer including a first surface to face an outer space environment and an opposing surface to face a body of a wearer of the spacesuit, spinning a plurality of MXene pathways in the woven layer to conductively couple the first surface and the opposing surface, and coating a layer of MXene particles on the opposing surface of the woven layer to form a MXene coating layer. In some examples, spinning the plurality of MXene pathways in the woven layer includes mixing a MXene compound with a polymer to form a MXene composite material and spinning the MXene composite material to form one or more fibers of the woven layer. In some examples, the MXene compound is titanium carbide (Ti2C), and a thickness of the MXene coating layer is between two-hundred (200) nanometers (nm) and one (1) micrometer (μm) in thickness). In some examples, the method may further comprise applying a polymer encapsulation layer on the MXene coating layer, and a thickness of the polymer encapsulation layer is between one (1) micrometer (μm) and ten (10) micrometers (μm).

While examples described herein are directed to configurations as shown, it should be appreciated that any of the components described or mentioned herein may be altered, changed, replaced, or modified, in size, shape, and numbers, or material, depending on application or use case, and adjusted for desired resolution or optimal measurement results. Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the optical measurements, for example, may also be performed partially or in full by other various components of the overall system.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A spacesuit for planetary exploration to provide charge mitigation on an outer surface of the spacesuit, the spacesuit comprising:
    a multilayered fabric including a woven layer, wherein the woven layer includes a first side to face a space environment and an opposing side to face a body of a wearer of the spacesuit; and
    a MXene coating layer applied on the opposing side, wherein the MXene coating layer extends through the woven layer to conductively couple a first location on an exterior surface of the spacesuit with a second location on the exterior surface of the spacesuit.

2. The spacesuit of claim 1, wherein the woven layer is comprised of an aramid fiber.

3. The spacesuit of claim 2, wherein the woven layer includes a plurality of MXene pathways to conductively couple the exterior surface of the spacesuit with the MXene coating layer.

4. The spacesuit of claim 3, wherein the plurality of MXene pathways extend from a direction of the opposing side.

5. The spacesuit of claim 1, further comprising a polymer encapsulation layer applied on a MXene coating layer.

6. The spacesuit of claim 1, wherein a thickness of the MXene coating layer is between two-hundred (200) nanometers (nm) and one (1) micrometer (μm) in thickness).

7. The spacesuit of claim 1, wherein the MXene coating layer is comprised of one or more of titanium carbide (Ti3C2), titanium carbide (Ti2C), and vanadium carbide (V2C).

8. A method for manufacturing fabric for a spacesuit having charge mitigation properties, the method comprising:
    providing a woven layer having a first surface to face an outer space environment and an opposing surface to face a body of a wearer of the spacesuit;
    integrating a plurality of MXene pathways in the woven layer to conductively couple the first surface and the opposing surface; and
    coating a layer of MXene particles on the opposing surface of the woven layer to form a MXene coating layer.

9. The method of claim 8, wherein integrating the plurality of MXene pathways includes treating the opposing surface with a MXene mixture liquid to enable penetration of the MXene mixture liquid in the woven layer.

10. The method of claim 9, wherein the MXene mixture liquid comprises a MXene compound and a carrier liquid.

11. The method of claim 9, wherein the plurality of MXene pathways extend from a direction of the opposing surface.

12. The method of claim 10, wherein providing the woven layer includes treating the woven layer to increase affinity between textile filaments of the woven layer and the MXene compound.

13. The method of claim 10, wherein providing the woven layer includes fabricating the woven layer to include predetermined spacing between textile filaments of the woven layer.

14. The method of claim 10, wherein the MXene compound is one ore more of vanadium carbide (V2C), titanium carbide (Ti3C2), and titanium carbide (Ti2C).

15. A method for manufacturing fabric for a spacesuit having charge mitigation properties, comprising:
    providing a woven layer including a first surface to face an outer space environment and an opposing surface to face a body of a wearer of the spacesuit;
    spinning a plurality of MXene pathways in the woven layer to conductively couple the first surface and the opposing surface; and
    coating a layer of MXene particles on the opposing surface of the woven layer to form a MXene coating layer.

16. The method of claim 15, wherein spinning the plurality of MXene pathways in the woven layer includes:
    mixing a MXene compound with a polymer to form a MXene composite material; and
    spinning the MXene composite material to form one or more fibers of the woven layer.

17. The method of claim 16, wherein the MXene compound is one or more of: titanium carbide (Ti2C), titanium carbide (Ti3C2), and vanadium carbide (V2C).

18. The method of claim 15, wherein a thickness of the MXene coating layer is between two-hundred (200) nanometers (nm) and one (1) micrometer (μm) in thickness).

19. The method of claim 15, further comprising applying a polymer encapsulation layer on the MXene coating layer.

20. The method of claim 19, wherein a thickness of the polymer encapsulation layer is between one (1) micrometer (μm) and ten (10) micrometers (μm).

* * * * *